Patented Nov. 22, 1949

2,488,719

UNITED STATES PATENT OFFICE 2,488,719

MAGNESIUM PYROPHOSPHATE PHOSPHOR

Herman C. Froelich, Cleveland Heights, Ohio, assignor to General Electric Company, a corporation of New York No Drawing. Application April 15, 1947,
Serial No. 741,693

3 Claims. (Cl. 252—301.4)

My invention relates to phosphors, that is, fluorescent or phosphorescent compositions.

In my application Serial No. 741,692, now Patent 2,455,415, of even date, I disclose and claim a phosphor consisting of a matrix of magnesium phosphate, preferably of pyrophosphate composition, activated by both trivalent cerium and thorium, and emitting ultraviolet radiations of longer wave length when excited by ultraviolet radiations of shorter wave length.

According to the present invention, I have discovered that the addition of manganese as a third activator to the cerium and thorium activated magnesium pyrophosphate phosphor results in an entirely new series of phosphors. They respond to excitation by radiation of 2537 Å. with the emission of varying shades of light, depending upon the composition. The colors produced range from light green to deep orange, plus small amounts of ultraviolet radiation and blue light.

A phosphor of magnesium pyrophosphate activated with manganese alone does not respond to 2537 Å. excitation, but gives green-yellow to orange light when excited with cathode rays, depending upon the manganese concentration. Magnesium pyrophosphate double activated with either cerium-manganese or thorium-manganese alone, likewise does not respond more than faintly to 2537 Å. excitation with the emission of visible radiations. The cathode ray response of these phosphors is governed primarily by the manganese concentration, giving mostly orange shades.

The triple activated phosphors comprising the present invention have, in general, an emission spectrum consisting of three bands. One band is in the ultraviolet with a peak near 3500 Å. The intensity of this band decreases with increasing concentrations of thorium and manganese. The intensity of this ultraviolet band is only a few per cent in the brightest phosphors. There is also a blue band with a peak around 4300 Å. Its intensity is likewise low. There is a third strong band in the visible which is apparently not complex and is determined by the "effective" manganese concentration. The "effective" manganese concentration is equal to or lower than its absolute concentration, and depends also upon the concentration of thorium. Within reason, it does not seem to depend upon the cerium concentration. Thus, the same color of orange may be obtained with a low concentration of manganese and high thorium, compared with high manganese and low thorium at a given concentration of cerium. However, the brightness of the phosphors having high thorium content is generally greater.

The shape of the emission curves in the visible is about the same for all colors, but the peak can be shifted from 5400 to 5950 Å. and possibly even further, depending upon the concentration of manganese and thorium. This range is nearly as wide as that of the well-known zinc-beryllium silicate system. In the latter system, however, both peak and shape are changed with composition.

In general, the fluorescent color can be made more orange by increasing (a) the manganese content, (b) the thorium content, (c) the firing temperature. The luminous output increases, and the ultraviolet output decreases with increasing thorium content.

The following is a range of compositions which may be used to obtain various useful results:

| | Mols |
|---|---|
| $Mg_2P_2O_7$ | 1 |
| $Ce_2O_3$ | .001 to .2 |
| $ThO_2$ | .001 to .5 |
| $MnO$ | .01 to .8 |

Although the activators are most likely present as phosphates, their concentrations have been given in terms of oxide.

It is at present not clear just why the triple activation is necessary and how the elementary acts of absorption, energy transfer and emission are tied up with the nature of the different activators. It seems clear that not all manganese atoms, for example, can participate equally in the emission act, else the color and brightness would not depend upon the thorium concentration. For this reason, I referred above to "effective" manganese concentration. Effective and absolute manganese concentration become identical only at very high concentrations of thorium. It appears as though the number of cerium atoms may be appreciably lower than the number of manganese atoms.

In the ultraviolet emitting magnesium pyrophosphate phosphors disclosed in my copending application referred to above, thorium sensitized the emission of cerium. Since neither of the combinations Ce-Mn and Th-Mn in the matrix responded to 2537 A. excitation, I choose to refer to the phenomenon of Ce-Th-Mn activation as an "induced" fluorescence. It is not known at the present time whether it is brought about by a change of field in the matrix, thus inducing the Mn to fluoresce where it normally would not, or whether there is an internal cascade transfer of radiant energy inducing the Mn to fluoresce.

The phosphors comprising my invention respond to 3650 Å. excitation with a weak emission in the deep red. The position of the peak does not seem to be affected by the concentration of any of the activators, but its intensity increases with the Mn concentration, up to a maximum. Thus the invention makes available some highly unusual phosphors which fluoresce deep red under long ultraviolet excitation, and yellow or green under short ultraviolet excitation.

The phosphor may be prepared by cold coprecipitation of magnesium, cerium, thorium and manganese phosphates as magnesium ammonium phosphate plus activators, and firing at temperatures of about 900–1200° C., preferably 1100° C., in an atmosphere of steam and hydrogen. More particularly, a suitable phosphor may be prepared in accordance with the following specific example: 255 grams $Mg(NO_3)_2 \cdot 6H_2O$, 7 grams $Ce(NO_3)_3 \cdot 6H_2O$, 35 grams $Th(NO_3)_4 \cdot 4H_2O$, and 10 cc. of a 50% manganese nitrate solution are dissolved in 1 liter of cold distilled water. To this is added, under vigorous stirring, a solution of 200 grams $(NH_4)_2HPO_4$ in 1 liter of water, followed by 200 cc. of concentrated ammonia. After some standing, the crystalline precipitate is filtered off, washed, dried, sieved, then fired in hydrogen and steam for 1 hr. at 1100° C. After cooling in hydrogen, the phosphor is sieved and then ready for use. Other methods of preparations may be followed.

In the above example the calculated composition is one mol $Mg_2P_2O_7$ to .016 mol $Ce_2O_3$, .127 mol $ThO_2$ and .084 mol MnO.

No other third activator in place of manganese has been found to be effective. Neither was any advantage obtained by adding manganese to cerium and thorium activated phosphates of calcium, aluminum and strontium. Also, compositions of orthophosphate proportions are definitely less bright than the pyrophosphate composition, and compositions more basic than orthophosphate were almost non-fluorescent.

The addition of comparatively small amounts of silica, say up to about 10%, improved the friability of the phosphor. While a nominal amount as low as .001% may be used, I prefer to use about 1 to 5% of silica.

The phosphor may be used as a coating on the inner surface of the envelope of a low pressure mercury discharge lamp such as those now commercially well-known.

What I claim as new and desire to secure by Letters Patent of the United States is:

1. A fluorescent composition consisting essentially of magnesium pyrophosphate activated by cerium, thorium and magnanese in approximately the range of proportions of 1 mol $Mg_2P_2O_7$, .001 to 0.2 mol $Ce_2O_3$, .001 to 0.5 mol $ThO_2$ and .01 to 0.8 mol MnO.

2. A fluorescent composition consisting essentially of magnesium pyrophosphate activated by cerium, thorium and manganese in approximately the range of proportions of 1 mol $Mg_2P_2O_7$, .001 to 0.2 mol $Ce_2O_3$, .001 to 0.5 mol $ThO_2$ and .01 to 0.8 mol MnO, and about .001–10% of silica.

3. A fluorescent composition consisting essentially of mangesium pyrophosphate activated by cerium, thorium and manganese in proportions of about 1 mol $Mg_2P_2O_7$ to .016 mol $Ce_2O_3$, .127 mol $ThO_2$ and .084 mol MnO.

HERMAN C. FROELICH.

REFERENCES CITED

The following references are of record in the file of this patent:

UNITED STATES PATENTS

| Number | Name | Date |
|---|---|---|
| 2,049,765 | Fischer | Aug. 4, 1936 |